Aug. 26, 1958     O. L. TAYLOR     2,848,768
FASTENING DEVICE

Filed Nov. 30, 1954     2 Sheets-Sheet 1

WITNESSES:

INVENTOR
Owen L. Taylor.
BY
ATTORNEY

Aug. 26, 1958 — O. L. TAYLOR — 2,848,768
FASTENING DEVICE
Filed Nov. 30, 1954 — 2 Sheets-Sheet 2

2,848,768

FASTENING DEVICE

Owen L. Taylor, Easton, Conn., assignor to The Bryant Electric Company, Bridgeport, Conn., a corporation of Connecticut Application November 30, 1954, Serial No. 472,154

12 Claims. (Cl. 20—92)

My invention relates to a fastening device and, more particularly, to a deformable fastening device for joining two parts together which are formed from a material which is relatively softer than the material from which the fastening device is formed.

In manufacturing various electrical wiring devices, such as low voltage switches, receptacles, and the like, it is a general practice to form the casings therefor in two parts from a molded plastic material. I have provided a new and improved deformable fastener of a relatively hard material which may readily be used to secure such casing parts together. Prior devices of a similar nature have not been entirely satisfactory for various reasons. Some prior devices have provided only one projection on a leg or legs which are deformed into engagement with the material to be secured together, whereby only a limited holding action may be obtained. Also, many of these types of devices must be manufactured to close tolerances with relation to the opening in the device for receiving the fastening, which tolerance requirements have materially increased the cost of such devices. Still other prior devices have required that the fastener be fabricated from several separate parts which are movable relative to each other to obtain such holding action which, due to the cost of fabricating separate items, has been an additional expense.

Accordingly, one object of my invention is to provide a new and improved deformable fastening device for joining two parts together which are formed from a material which is softer than the material from which the fastening device is joined.

Another object of my invention is to provide a new and improved elongated deformable fastening device for joining two parts together and which device is adapted to have each of its sides forced into engagement with the several parts to be joined.

Another object of my invention is to provide a new and improved elongated deformable fastening device for joining two parts together and which device has a plurality of outwardly extending projections at each of its sides which are adapted to be forced into engagement with the several parts to be joined.

Another object of my invention is to provide a new and improved elongated deformable fastening device for joining two parts together and which device has one side vertically displaced from the other and movable with respect thereto.

Still another object of my invention is to provide a new and improved elongated deformable fastening device for joining two parts together and which device has a plurality of outwardly extending projections for engaging each of the parts to be joined together at each of its sides.

A further object of my invention is to provide a new and improved elongated deformable fastening device for joining two parts together and which device may readily be fabricated by being blanked out of a sheet of suitable material in a single operation.

Another object of my invention is to provide a new and improved metal elongated deformable fastening device for joining two parts together and which device has the greater portion of its material between its sides removed.

Another object of my invention is to provide a new and improved two piece wiring device having formed openings therein for receiving a new and improved fastening device therein which may be easily deformed to secure the pieces of the wiring device together.

A more specific object of my invention is to provide a new and improved wiring device comprising two insulating housing members which are provided with a pair of slots for receiving therein a new and improved fastening device therein which may easily be deformed to secure the housing members together.

These and other object of my invention will become apparent when taken in conjunction with the following drawings and detailed description of a preferred embodiment thereof, in which.

Figure 4:
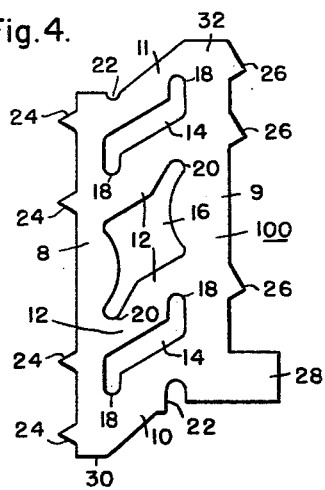
Fig. 4 is a side elevational view of a fastening device constructed in accordance with the principles of my invention.

A fastening device constructed in accordance with the principles of my invention is preferably formed from any suitable material, such as steel, which may readily be deformed by applying a nominal force thereto and which is harder than the material from which the parts to be joined together are formed. As shown in Fig. 4, such a fastening device 100 is fabricated, in its initial or non-deformed condition, so as to be substantially a parallelogram in form having a pair of spaced, substantially parallel, vertically displaced side legs 8 and 9. Legs 8 and 9 are joined together at their lower and upper ends by means of cross bars 10 and 11 extending obliquely therebetween, respectively, and which are located so as to be substantially parallel to each other. In order to obtain additional cross bracing of legs 8 and 9, cross brace 12 may be provided adjacent each of bars 10 and 11 which extends angularly between the sides 8 and 9 so as to be substantially parallel to the bars 10 and 11. By such a construction, an opening 14 is provided between each brace 12 and its adjacent bar 10 or 11, and an opening 16 is provided between the cross braces 12. As shown, openings 14 have approximately the same contour and are somewhat smaller than opening 16. Such spacing is, however, a matter of design and is not critical for the function of my fastening device. Similarly, if desired the two braces 12 could be eliminated or additional ones provided without affecting the functioning of my fastening device. As shown, openings 14 are irregular in form and each is provided with notches 18 at opposite ends thereof at opposite sides.

Figure 2:
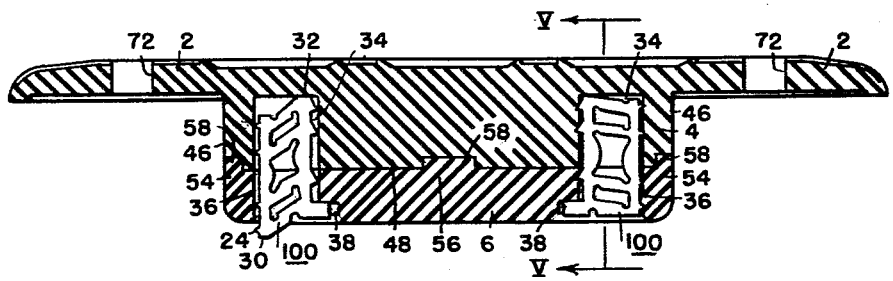
Fig. 2 is a longitudinal cross-sectional view of the wiring device shown in Fig. 1 taken substantially along the lines II—II thereof.
Figure 3:
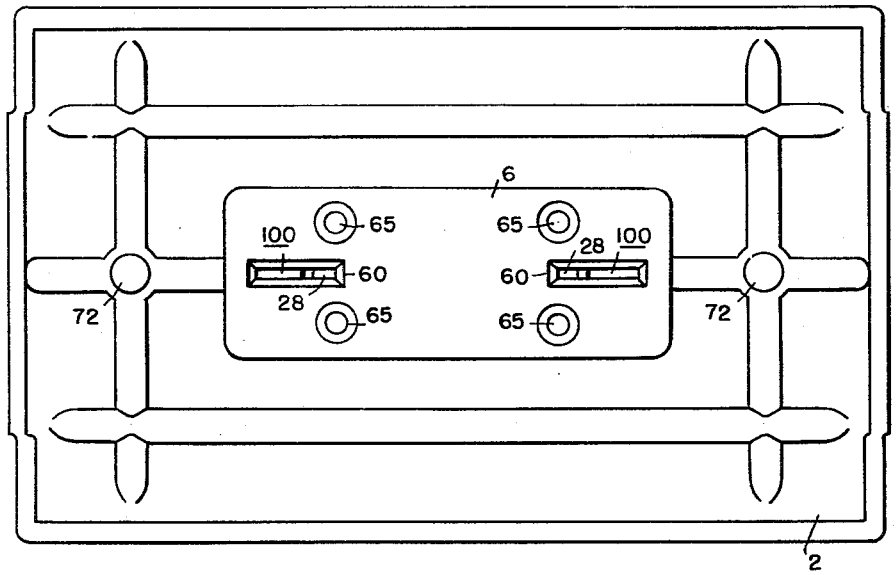
Fig. 3 is a bottom plan view of the wiring device shown in Fig. 1.

As will become more apparent hereinafter and as shown in Fig. 2, one leg of the fastening device remains substantially stationary when the fastening device is deformed, while the other leg thereof is vertically displaced with relation thereto so that the upper and lower bars 11 and 10 are approximately in horizontal alignment with each other. As shown, leg 9 remains substantially stationary while leg 8 is so displaced. Under these conditions, notches 18 adjacent leg 9 extend upwardly along leg 9, while notches 18 adjacent leg 8 extend downwardly along leg 8. By such a construction, the cross-sectional area of bars 10 and 11 and the cross braces 12 is reduced so as to facilitate the movement of leg 8 with respect to leg 9. Opening 16 is provided with similarly located angularly extending notches 20 for the same purpose as notches 18. Also, the outer edges of bars 10 and 11 are provided with inwardly extending approximately semicircular notches 22 adjacent legs 8 and 9, respectively opposite the ends thereof in which notches 18 are located for the same purpose as notches 18.

It will also be noted that the outer edges of legs 8 and 9 are each provided with a plurality of outwardly extending substantially triangularly shaped projections 24 and 26, respectively. As shown, leg 8 is provided with four spaced projections 24, and leg 9 is provided with three spaced projections 26. Projections 24 are substantially uniform about their horizontal center line; however, projections 26 are provided with an increased area in the direction the movable leg 8 is moved. It will be further noted that there is provided a flat portion 30 at the lower end of leg 8 adjacent the lower bar 10, and a similar flat portion 32 at the end of leg 9 adjacent the upper bar 11, for a purpose which will hereinafter be described. Also, the other end of side 9 which is adjacent the lower bar 10 is provided with a laterally outwardly extending tab 28 for locating purposes, as is also more fully described hereinafter.

As indicated, a fastening device constructed in accordance with the principles of my invention is ideally suited for joining two molded plastic parts together. Accordingly, for illustrating such purpose the drawings show an electrical receptacle comprising a rectangular face plate 2 having an integral inverted cup-shaped upper housing 4 extending downwardly therefrom and a separate formed cup-shaped lower base 6 which is adapted to engage the lower edges of housing 4 so as to form therewith an enclosure for receiving electrical components therein. Although such drawings are of an electrical receptacle, it is believed obvious that a fastening device constructed in accordance with the principles of my invention is equally satisfactory for securing similar parts of other devices together which are utilized in entirely different applications, and, accordingly, the drawings should be considered as illustrative only.

Face plate 2, housing 4, and base 6 may be formed from any suitable insulating material which may be engageable by the projections 24 and 26 of the previously described fastening device in a manner as hereinafter described. For such purpose, an insulating material which may readily be fabricated as a molded article by any suitable process, such as extrusion molding, ejection molding, compression molding, or the like, is desirable. For these purposes, a phenolaldehyde resin, polyglycolterephthalate, butadiene, condensation product of hexamethylenediamine and adipic acid, or polytrifluoromonochloroethylene, are satisfactory.

Referring to Figs. 1, 2, 3 and 5, it will be noted that the housing 4 is provided with a longitudinally elongated upwardly extending recess 34 adjacent each of its ends, and that base 6 is provided with a longitudinally elongated slot 36 adjacent each of its ends which have substantially the same cross-section as recesses 34. Slots 36 are located in base 6 so that when the base 6 is located in engagement with the lower edge of upper housing 4, slots 36 are in horizontal and vertical alignment with the spaced recesses 34 in upper housing 4. Base 6 is also provided with a downwardly open longitudinally inwardly extending recess 38 from each slot 36. Recess 38 are open at the side adjacent slot 36. Although recesses 38 may be located on either side of slots 36, as shown, recesses 36 are located so as to extend longitudinally inwardly toward each other from the inwardly spaced sides of slots 36.

As more clearly shown in the left side of Fig. 2, when base 6 and housing 4 are assembled, a fastening device 100 may be freely inserted therein by inserting the end of a fastening device 100 opposite tab 28 through a slot 36 and into the aligned recess 34 until the upper edge of tab 28 engages the lower edge of recess 38 whereby further insertion of fastening device 100 is prevented. When so inserted, it will be noted that the flat portion 30 on leg 8 extends downwardly from the lower surface of base 6, and that the flat portion 32 of leg 9 engages the upper edge of the upwardly extending recess 34. Also, as the tab 28 has entered the adjacent recess 38, its lower edge is located slightly above the lower edge of the lower base 6.

It will further be noted that all of the projections 24 except the lowermost one, and all of the projections 26 are located closely adjacent the vertically extending ends of recess 34 or slot 36. In order to support the fastening device 100 freely within the recesses 34 and slots 36, it will be noted, as more clearly shown in Fig. 5, that the transverse width of each recess 34 and slot 36 is only slightly greater than the width of fastening device 100. When fastening device 100 is so located, it may be easily deformed by engaging the flat portion 30 thereof with suitable force so that leg 8 is moved vertically upwardly with respect to leg 9 into its slot 36 and recess 34. Face plate 2, housing 4 and base 6 may be supported in any suitable manner when fastening device 100 is so deformed.

As a result of applying force to the flat portion 32 of fastening device 100, the leg 8 thereof will be moved upwardly into recess 34, thereby causing the angle between cross bars 10 and 11 and legs 8 and 9 to change so as to become more nearly perpendicular to each other. By providing the notches 18 and 22, the bending stress between cross bars 10 and 11 and legs 8 and 9 is concentrated thereat, due to the well-known notch effect, so that the notches 18 and 22 are also the bending points between cross bars 10 and 11 and legs 8 and 9. Such upward movement of leg 8 also causes the projections 26 on leg 9 to be forced outwardly into engagement with the adjacent vertical extending side of recess 34 and slot 36, whereby the projections 26 will prevent leg 9 from moving downwardly and outwardly of recess 34. As leg 9 remains stationary, the cross bars 10 and 11 will pivot with respect thereto as the leg 8 is forced upwardly into recess 34. As cross bars 10 and 11 are initially sloped downwardly and outwardly of slot 36 from the leg 9, the horizontal component of their length will increase as leg 8 continues to move upwardly, which expansion is appreciable in distance and causes a substantial horizontal force to be exerted against the vertical extending restraining end wall of recess 34 and slot 36 adjacent leg 9, whereby projections 26 are forced outwardly so that they penetrate therein. Thus, the penetration of the projections 26 on leg 9 as indicated, securely fastens the upper housing 4 to the base 6. The projections 24 on the leg 8 are primarily for the purpose of preventing leg 8 from moving in a direction whereby the force exerted upon leg 9 would be lowered. Such action will, however, cause the projections 26 to penetrate the vertically extending end wall of recess 34 and slot 36 adjacent therewith to some degree, whereby the force holding the upper housing 4 and the base 6 is increased. Inasmuch as the cross braces 12 and the slots 20 are located in substantially the same manner as cross bars 10 and 11 and slots 18 and 22, respectively, it will be appreciated that these components function in the same manner as do cross bars 10 and 11 and slots 18 and 22.

As more clearly shown at the right side of Fig. 2, when leg 8 of fastening device 100 is so moved, the flat portion 30 thereof is forced upwardly so as to be substantially in horizontal alignment with the tab 28 whereby the lower edge of fastening device 100 is above the lower edge of base 6. As shown, it will be noted that the two upper projections 26 and 24 engage the upper housing 4 while the lower projection 26 and the two lower projections 24 engage the base 6. Further, if desired, the bottom edge of recess 36 and recess 38 in base 6 may be flared outwardly as at 60 in order to facilitate the insertion of the fastening device 100 within the slots 36, and in order to provide an enlarged area for receiving a suitable tool for engaging the lower end portion 30 of fastening device 100 during the period it is deformed.

It is believed obvious from the above description that housing 4 and base 6 must be fabricated from material which is softer material than the material from which fastening device 100 is fabricated in order that projections 26 and 24 may penetrate into housing 4 and base 6 sufficiently to hold them together. The materials previously indicated are satisfactory from this standpoint. Further, if desired, in order to provide a space transversely to the fastening device 100, each recess 34 and slot 36 may be provided with an upwardly and transversely extending cup-shaped recess 40 and a downwardly and transversely extending cup-shaped recess 42, respectively, at each side thereof. As shown (Fig. 5), the upper edge of each recess 40 terminates below the lower edge of recess 34, and the lower edge of each recess 42 terminates above the lower edge of slot 36, whereby an enlarged central area is obtained within the recesses 34 and slots 36. By such construction, the bars 10 and 11, and cross braces 12 may bulge somewhat transversely outwardly therein when the fastening device 100 is deformed as indicated.

Figure 1:
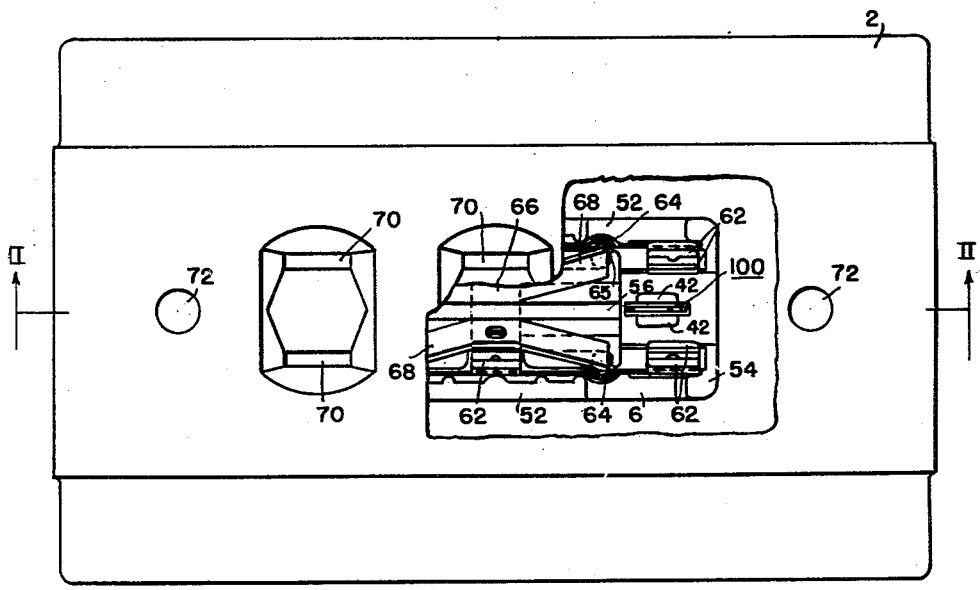
Figure 1 is a top plan view of an electrical wiring device having a portion thereof removed to expose various electrical components of the device and a fastening device constructed in accordance with the principles of my invention for holding such wiring device together.
Figure 5:
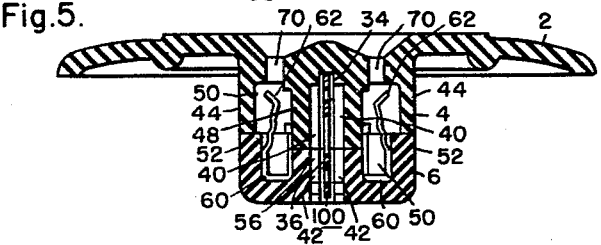
Fig. 5 is a cross-sectional view of the wiring device shown in Fig. 1 taken substantially along the line V—V of Fig. 2.

Referring to Figs. 1, 2, and 5, housing 4 as shown therein comprises a pair of longitudinally extending laterally spaced side walls 44 which are joined together at each of their ends by means of a laterally extending end wall 46. A longitudinally extending barrier 48 is located on substantially the longitudinally center line of housing 4 which extends between the end walls 46 so as to divide housing 4 into two longitudinally and upwardly extending chambers. Base 6 is provided with upwardly extending side walls 52 connected by end walls 54, and having a longitudinally extending central barrier 56. The upper edges of side walls 52, end walls 54, and central barrier 56 are cooperable with the lower edges of the side walls 44, end walls 46, and central barrier 48 of housing 4, respectively, whereby a pair of laterally spaced longitudinally extending chambers 50 are provided in the assembly of housing 4 and base 6. If desired, side walls 44, end walls 46 and barrier 48 of housing 4 and side walls 52, end walls 54 and barrier 56 of base 6 may be provided with matting projections and recesses 58 so that housing 4 and base 6 may be keyed in a manner so that they can only be assembled together in one way. Each barrier 48 and 56 is enlarged at each of its ends in order to provide sufficient material for the forming of recesses 40 and 34 therein; recesses 42 and slots 36 in housing 4 and base 6 respectively. Although as shown, slots 36 and recesses 34 are provided on the longitudinally extending center line of both the housing 4 and base 6, they may be moved to other locations. However, by locating them on the longitudinal center line, a more uniformly distributed holding force is obtained.

In order to provide electrical conducting members within each chamber 50 (Fig. 2), an elongated contact 60 is located along the inner surface of each side wall 52 of base 6 having upwardly extending contact prongs 62 located at longitudinally spaced intervals. Each contact 60 is provided with a pair of longitudinally spaced wire guides 64 which are located in alignment with openings 65, respectively, in the bottom of base 6 in order that wiring connections may readily be made thereto.

Also, base 6 is provided with a supporting projection 66 on each side of barrier 56 which extends transversely into each chamber 50 on substantially its lateral central line for supporting a bent leaf spring 68 thereon. The construction of the internal surfaces of housing 4 and base 6 in order to receive and support the springs 68 and contacts 60 is more particularly described and claimed in my copending application entitled Wiring Device, Serial No. 463,771, filed October 21, 1954, which has been assigned to the same assignee as this invention. This same case also more particularly describes the construction of the material for the spring 68, the contact 60 and the means for releasing an inserted electrical conductor. Further, in order to provide means for permitting electrical contacts to engage the contact prongs 62 of contact 60, face plate 2 is provided with a plurality of spaced openings 70 located so that an opening 70 is located above each contact prong 62. Also, in order to secure face plate 2 in any suitable securing means, a pair of longitudinally spaced openings 72 are provided whereby securing means may extend therethrough to engage such support means (not shown).

By my construction I have provided a new and improved fastening device which is ideally suited to be fabricated from flat sheet steel stock. Further, the fastener is easily and quickly installed by a simple deforming operation. Thus, the total cost of manufacturing and using such a fastener is quite low. In addition, as the fastener is recessed within the wiring device, it is relatively "tamper proof" as it is practically impossible to obtain sufficient purchase on the edges of the fastener to remove it.

Although I have shown and described a particular preferred embodiment of my invention in accordance with the patent statutes, I am aware that modifications thereof may be made without departing from the broad spirit and scope of my invention. Accordingly, it is desired that my invention be not limited except insofar as is necessitated by the prior art.

I claim as my invention:

1. A one piece deformable fastening device comprising a pair of spaced elongated substantially parallel legs, one end of one of said legs extending substantially beyond the adjacent end of the other of said legs so that said legs are longitudinally offset from each other, at least one cross brace extending angularly between said legs so as to be approximately parallel to the slope of said offset, and a plurality of projections extending outwardly from the outer side edge of said other of said legs whereby when said one of said legs is moved longitudinally relative to the other said cross brace moves substantially pivotally with respect to both of said legs to substantially vary the lateral spacing of said legs.

2. A one piece deformable fastening device comprising, a pair of elongated, spaced, substantially parallel legs of approximately equal length, one of said legs being substantially longitudinally offset from the other, a cross brace extending obliquely between adjacent ends of said legs, respectively, and a plurality of locking projections extending outwardly from the outer side edge of each of said legs, respectively, whereby when at least one of said legs is moved longitudinally in one direction relative to the other said cross brace moves substantially pivotally with respect to both of said legs toward a normal position relative to the legs to move them a substantial distance laterally outwardly.

3. A one piece deformable fastening device comprising a pair of elongated, spaced, substantially parallel legs of approximately equal length, one of said legs being substantially longitudinally offset from the other, spaced cross braces extending obliquely between adjacent ends of said legs, respectively, a locating tab extending transversely outwardly from the end of the one of said legs which is offset inwardly from the end of the other leg, and a plurality of projections extending outwardly from the outer side edge of at least said one of said legs whereby said cross braces move substantially pivotally with respect to said legs upon longitudinal movement of said other leg.

4. A one piece deformable fastening device comprising a pair of elongated, spaced, substantially parallel legs of approximately equal length, one of said legs being substantially longitudinally offset from the other, a plurality of cross braces extending obliquely between said legs, each of said cross braces being provided with a notch extending laterally inwardly thereof at the junction thereof with each of said legs, all of said notches adjacent one leg extending in one direction along said leg, all of said notches adjacent the other leg extending in the opposite direction to those along said one leg, and a plurality of projections extending outwardly from the outer side edge of at least one of said legs.

5. A one piece deformable fastening device comprising a pair of elongated, spaced, substantially parallel legs of approximately equal length, one of said legs being substantially longitudinally offset from the other, first cross braces extending angularly between adjacent ends of said legs, respectively, second cross braces extending angularly between said legs inwardly adjacent each of said first cross braces, respectively, each of said first and second cross braces being provided with a notch extending laterally inwardly thereof at the junction thereof with each of said legs, all of said notches adjacent one leg extending in one direction along said leg, all of said notches adjacent the other leg extending in the opposite direction to those along said one leg, and a plurality of projections extending outwardly from the outer side edge of at least one of said legs whereby said cross braces move substantially pivotally with respect to said legs upon longitudinal movement of said other leg.

6. A device of the type described comprising, a two part casing formed from a relatively soft material, one of said casing parts having at least one elongated recess therein, the other of said casing parts having at least one elongated slot therethrough having substantially the same cross section as said recess, said casing parts being adapted to be fitted together with said recess and said slot in alignment to form an elongated chamber, a one piece deformable fastening device of a relatively hard material having a pair of legs which are spaced so as to be insertable within said chamber with the outer sides of said legs located closely adjacent the ends thereof, said legs being offset longitudinally from each other and being of a length so that only one end of one of said legs extends externally from said other casing part when the other end of the other leg is in engagement with the bottom of said recess, said fastening device being deformable by applying a force to said one end of said one leg so that said one leg is forced inwardly of said aligned slot and recess, and means integral with said fastening device and connecting said legs so that inward movement of said one leg causes said outer sides of said legs to firmly engage the ends of said chamber.

7. A device of the type described comprising, a two part casing formed from a relatively soft material, one of said casing parts having at least one elongated recess therein, the other of said casing parts having at least one elongated slot therethrough having substantially the same cross section as said recess, said casing parts being adapted to be fitted together with said recess and said slot in alignment to form an elongated chamber, a one piece deformable fastening device of a relatively hard material having a pair of legs which are spaced so as to be insertable within said chamber with the outer edges of said legs located closely adjacent the ends thereof, said legs being offset longitudinally from each other and being of a length so that only one end of one of said legs extends externally from said other casing part when the other end of the other leg is in engagement with the bottom of said recess, said fastening device being deformable by applying a force to said one end of said one leg so that said one leg is forced inwardly of said aligned slot and recess, cross bracing means integral with said fastening device and connecting said legs so that inward movement of said one leg causes said outer sides of said legs to firmly engage the ends of said aligned slot and recess, and said chamber having at least one of its sides recessed for receiving portions of said cross bracing means when said one leg is forced inwardly.

8. A device of the type described comprising, a two part casing formed from a relatively soft material, one of said casing parts having at least one elongated recess therein, the other of said casing parts having at least one elongated slot therethrough having substantially the same cross section as said recess, said casing parts being adapted to be fitted together with said recess and said slot in alignment to form an elongated chamber, a one piece deformable fastening device of a relatively hard material having a pair of legs which are spaced so as to be insertable within said chamber with the outer edges of said legs located closely adjacent the ends thereof, said legs being offset longitudinally from each other and being of a length so that only one end of one of said legs extends externally from said other casing part when the other end of the other leg is in engagement with the bottom of said recess, said fastening device being deformable by applying a force to said one end of said one leg so that said one leg is forced inwardly of said aligned slot and recess, cross bracing means integral with said fastening device and connecting said legs so that inward movement of said one leg causes said outer sides of said legs to firmly engage the ends of said aligned slot and recess, and said aligned slot and recess having its central portion transversely enlarged at each side thereof by means of offsets in said casing parts whereby said cross bracing means may move transversely when said one leg is forced inwardly.

9. A device of the type described comprising, a two part casing formed from a relatively soft material, one of said casing parts having a pair of spaced elongated recesses therein, the other of said casing parts having a pair of spaced elongated slots therethrough having substantially the same cross section as said recesses, said casing parts being adapted to be fitted together to form elongated chambers when said recesses are aligned with said slots, respectively, a one piece deformable parallelogrammic fastening device of relatively hard material insertable within each of said chambers with the outer sides of its longer legs closely adjacent the ends thereof, said legs being offset longitudinally from each other and being of a length so that the inner end of one of said longer legs of each of said fastening devices is substantially in engagement with the base of its cooperating recess and the other of said longer legs of each of said fastening devices extends outwardly of said other casing part, said fastening devices being deformable by applying a force to said externally extending portions thereof so that said fastening devices are deformed approximately into a rectangle, means projecting outwardly from at least one of said longer legs of each of said fastening devices which are adapted to firmly engage at least one end of said chambers when said fastening devices are deformed.

10. A device of the type described comprising, a two-part casing having an open ended chamber therein with portions of said chamber being formed by said casing parts, respectively, a one-piece deformable fastening device having a pair of elongated legs which are spaced so as to be insertable within said chamber with the outer edges of said legs located adjacent opposite walls of the chamber, said legs being offset longitudinally from each other and being of a length less than the depth of said chamber so that only one end of one of said legs extends externally from said casing when the other end of the other leg is in engagement with the bottom of said chamber, said fastening device being deformable by applying a force to said one end of said one leg so that said one leg is forced inwardly of said chamber, cross bracing means integral with said fastening device and connecting said legs so that inward movement of said one leg causes said outer sides of said legs to firmly engage adjacent walls of said chamber.

11. A device of the type described comprising, a two-part casing having an open ended chamber therein with portions of said chamber being formed by said casing parts, respectively, a one-piece deformable fastening device having a pair of elongated legs which are spaced so as to be insertable within said chamber with the outer side edges of said legs located adjacent opposite walls of said chamber, said legs being offset longitudinally from each other so that one end of one leg is located adjacent an intermediate portion of the other leg, said legs being of a length less than the depth of said chamber, a slot in said casing extending outwardly from said chamber at the open end thereof, a projection extending outwardly from said one end of said one leg of a size to be located within said slot so that the distance said fastening device is insertable within said chamber is limited by the engagement of said projection in said slot and one end of said other leg extends outwardly beyond said chamber, said fastening device being deformable by applying a force to said one end of said other leg so that said other leg is forced inwardly of said chamber, cross bracing means integral with said fastening device and connecting said legs so that said inward movement of said other leg causes the outer sides of said legs to firmly engage said opposite walls of said chamber.

12. A one piece deformable fastening device comprising a pair of elongated, spaced, substantially parallel legs of approximately equal length, one of said legs being substantially longitudinally offset from the other, spaced cross braces extending obliquely between adjacent ends of said legs, respectively, and a plurality of projections extending outwardly from the outer side edge of at least said one of said legs whereby said cross braces move substantially pivotally with respect to said legs upon longitudinal movement of said other leg.

References Cited in the file of this patent

UNITED STATES PATENTS

| | | |
|---|---|---|
| 2,037,122 | Despart | Apr. 14, 1936 |
| 2,231,289 | Judisch et al. | Feb. 11, 1941 |
| 2,315,523 | Hubbell | Apr. 6, 1943 |
| 2,329,471 | King | Sept. 14, 1943 |
| 2,495,104 | Huppert | Jan. 17, 1950 |
| 2,501,701 | Tinnerman | Mar. 28, 1950 |